(12) United States Patent
Fiedel et al.

(10) Patent No.: US 10,106,644 B2
(45) Date of Patent: Oct. 23, 2018

(54) POLYOXYALKYLENES CONTAINING GUANIDINE AND METHOD FOR THE PRODUCTION THEREOF

(71) Applicant: Evonik Degussa GmbH, Essen (DE)

(72) Inventors: Olga Fiedel, Essen (DE); Frank Schubert, Neukirchen-Vluyn (DE); Michael Fiedel, Essen (DE)

(73) Assignee: Evonik Degussa GmbH, Essen (DE)

( * ) Notice: Subject to any disclaimer, the term of this patent is extended or adjusted under 35 U.S.C. 154(b) by 148 days.

(21) Appl. No.: 15/311,776

(22) PCT Filed: May 13, 2015

(86) PCT No.: PCT/EP2015/060592
§ 371 (c)(1),
(2) Date: Nov. 16, 2016

(87) PCT Pub. No.: WO2015/173302
PCT Pub. Date: Nov. 19, 2015

(65) Prior Publication Data
US 2017/0081464 A1    Mar. 23, 2017

(30) Foreign Application Priority Data
May 16, 2014  (DE) .................. 10 2014 209 355

(51) Int. Cl.
| | |
|---|---|
| *C08G 2/00* | (2006.01) |
| *C08G 59/40* | (2006.01) |
| *C08G 65/24* | (2006.01) |
| *C09D 163/00* | (2006.01) |
| *C08G 65/26* | (2006.01) |
| *C08G 65/333* | (2006.01) |

(52) U.S. Cl.
CPC ......... *C08G 59/4021* (2013.01); *C08G 65/24* (2013.01); *C08G 65/2663* (2013.01); *C08G 65/33303* (2013.01); *C08G 65/33306* (2013.01); *C09D 163/00* (2013.01)

(58) Field of Classification Search
None
See application file for complete search history.

(56) References Cited

U.S. PATENT DOCUMENTS

| | | | |
|---|---|---|---|
| 3,391,113 A | 7/1968 | Lopez et al. | |
| 4,268,644 A | 5/1981 | Maeda et al. | |
| 4,310,643 A | 1/1982 | Maeda et al. | |
| 5,723,133 A | 3/1998 | Nagai et al. | |
| 6,187,955 B1 | 2/2001 | Nagai et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,420,567 B1 | 4/2013 | Naumann et al. | |
| 8,450,514 B2 | 5/2013 | Schubert et al. | |
| 8,476,189 B1 | 7/2013 | Naumann et al. | |
| 8,729,207 B2 | 5/2014 | Hartung et al. | |
| 8,772,423 B2 | 7/2014 | De Gans et al. | |
| 8,779,079 B2 | 7/2014 | Henning et al. | |
| 8,802,744 B2 | 8/2014 | Knott et al. | |
| 8,883,932 B2 | 11/2014 | Brugger et al. | |
| 8,921,437 B2 | 12/2014 | Knott et al. | |
| 8,957,009 B2 | 2/2015 | Schubert et al. | |
| 8,974,627 B2 | 3/2015 | Schubert et al. | |
| 8,993,706 B2 | 3/2015 | Schubert et al. | |
| 9,035,011 B2 | 5/2015 | Ferenz et al. | |
| 9,051,424 B2 | 6/2015 | Lobert et al. | |
| 9,068,044 B2 | 6/2015 | Schubert et al. | |
| 9,115,335 B2 | 8/2015 | Trosin et al. | |
| 9,175,126 B2 | 11/2015 | Albrecht et al. | |
| 9,315,614 B2 | 4/2016 | Schubert et al. | |
| 9,346,919 B2 | 5/2016 | Jazkewitsch et al. | |
| 9,353,225 B2 | 5/2016 | Knott et al. | |
| 9,440,220 B2 | 9/2016 | Naumann et al. | |
| 9,550,928 B2 | 1/2017 | Lobert et al. | |
| 9,783,635 B2 | 10/2017 | Schubert et al. | |
| 9,975,909 B2 | 5/2018 | Schubert et al. | |
| 2009/0137752 A1 | 5/2009 | Knott et al. | |
| 2010/0081781 A1 | 4/2010 | Schubert et al. | |
| 2010/0266518 A1 | 10/2010 | Springer et al. | |
| 2011/0130524 A1 | 6/2011 | Wittenbecher et al. | |
| 2012/0028022 A1 | 2/2012 | Brugger et al. | |
| 2012/0037036 A1 | 2/2012 | Veit et al. | |
| 2012/0068110 A1 | 3/2012 | Schubert et al. | |
| 2012/0190760 A1 | 7/2012 | Henning et al. | |
| 2013/0213267 A1 | 8/2013 | Fiedel et al. | |
| 2013/0217930 A1 | 8/2013 | Haensel et al. | |
| 2013/0245304 A1 | 9/2013 | Schubert et al. | |
| 2013/0345318 A1 | 12/2013 | Schubert et al. | |
| 2015/0057412 A1 | 2/2015 | Knott et al. | |
| 2015/0093575 A1 | 4/2015 | Naumann et al. | |
| 2015/0329752 A1 | 11/2015 | Albrecht et al. | |
| 2016/0053051 A1 | 2/2016 | Schubert et al. | |
| 2016/0053145 A1 | 2/2016 | Lobert et al. | |

(Continued)

FOREIGN PATENT DOCUMENTS

WO    WO 2008/059159 A1    5/2008

OTHER PUBLICATIONS

International Search Report dated Sep. 9, 2015, in PCT/EP2015/060592 filed May 13, 2015.

(Continued)

*Primary Examiner* — Robert T Butcher
(74) *Attorney, Agent, or Firm* — Grüneberg and Myers PLLC

(57) ABSTRACT

The invention relates to polyoxyalkylenes which contain guanidine groups in the side chain, and to a process for their preparation.

20 Claims, No Drawings

(56) References Cited

U.S. PATENT DOCUMENTS

2016/0130402 A1  5/2016  Schubert et al.
2016/0160081 A1  6/2016  Klotzbach et al.

OTHER PUBLICATIONS

Bonduelle, C.V. et al., "Dendritic Guanidines as Efficient Analogues of Cell Penetrating Peptides", Pharmaceuticals, ISSN 1424-8247, vol. 3, (2010), pp. 636-666, XP-002742157.

POLYOXYALKYLENES CONTAINING GUANIDINE AND METHOD FOR THE PRODUCTION THEREOF

The invention relates to polyoxyalkylenes which contain guanidine groups in the side chain, and to a process for their preparation.

PRIOR ART

In the context of this invention, guanidines (guanidine derivatives, guanidine-containing compounds) are understood as meaning imino derivatives of urea which contain at least one imine unit to whose sp2-hybridized carbon two amino groups are bonded. Guanidine-group-containing compounds occur in nature in the form of amino acid arginine or organic acid kreatine and are commercially available as muscle-building preparations.

Guanidines are some of the strongest known organic bases which gives rise to this class of compound having such applications as curing agents for epoxide resins or alkoxysilyl-group-carrying systems (DE 10 2013 216787), and also basic catalysts for a large number of organic reactions. Furthermore, some guanidine compounds have a fungicidal or biocidal effect (EP 0534501).

As a result of the high basicity, guanidine is present virtually exclusively in protonated form and can, as structural element, bring about higher polarity or hydrophilicity and form hydrogen bridge bonds. On account of these, alkylguanidines for example have found their way into the cosmetic sector as cationic emulsifiers (EP 1671615). Guanidine compounds also exert a positive effect on the skin and hair by increasing the strength of these. For example, a patent specification from Kao Corporation claims in 1995 (U.S. Pat. No. 5,723,133) guanidine derivatives for cosmetic formulations and praises their moisturising effect. The patent specification EP 1844106 also describes guanidine-functionalized siloxanes as one component of shampoos and hair conditioners for increasing the strength, repairing damaged hair coupled with simultaneous improvement in combability and softness. Against the background of these manifold use possibilities, it is of great importance to develop further guanidine-group-carrying compounds.

To date, only the synthesis of α,ω-guanidine-functionalized polyethers is known in the literature (WO2008059159A1). Consequently, the current prior art lacks a process which allows a polymer with more than a twofold guanidine functionality to be produced, where the number of inserted guanidine groups in the polymer is controllable by a simple variation of the process conditions.

It was therefore an object of the present invention to provide polymers with an adjustable number of guanidino groups.

The subject matter of the present invention is therefore the provision of guanidine-group-containing polymers as described in the claims.

A further subject matter of the present invention is a process for the preparation of the guanidine-group-containing polymers according to the invention.

A further subject matter of the present invention is the use of the guanidine-group-containing polymers according to the invention, and also the use of the products of the process according to the invention.

The guanidine-group-containing polymers according to the invention, the process according to the invention for the preparation of the guanidine-group-containing polymers, and also the use according to the invention of the guanidine-group-containing polymers and the process products are described by way of example below without any intention of limiting the invention to these exemplary embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. Where % figures are given below, they are figures in % by weight unless otherwise indicated. In the case of compositions, the % figures, unless otherwise indicated, are based on the overall composition. Where average values are reported below, the averages in question are mass averages (weight averages), unless otherwise indicated. Where measurement values are given below, these were measurement values ascertained at a pressure of 101 325 Pa and at a temperature of 23° C., unless stated otherwise.

In connection with this invention, the word fragment "poly" encompasses not only exclusively compounds with at least 3 repeat units of one or more monomers in the molecule, but in particular also those compositions of compounds which have a molecular weight distribution and in so doing have an average molecular weight of at least 200 g/mol. This definition accounts for the circumstance that within the field of art in question it is common to identify such compounds as polymers even when they do not yet appear to satisfy the definition of a polymer as per OECD or REACH guidelines.

Preferably, the guanidine-group-containing polymers according to the invention have the structural element

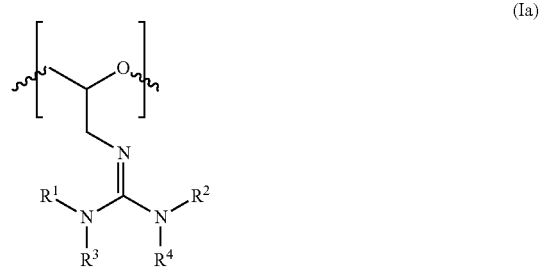

(Ia)

at least once in comb position, where $R^1$, $R^2$, $R^3$ and $R^4$, independently of one another, are a linear, cyclic or branched, aliphatic saturated or unsaturated hydrocarbon radical having 1 up to 30 carbon atoms, or an aromatic hydrocarbon radical having 6 up to 30 carbon atoms, which can also contain heteroatoms.

The term "comb position" means that in formula (1a) the bonds shown as wavy lines are part of a polyether, and in each case at least one oxyalkylene group, which can optionally also be substituted, is adjacent. Preferably, the guanidine-group-containing polymers according to the invention do not have the structural element of the formula (1a) in the terminal position.

Preferably, the radicals $R^1$, $R^2$, $R^3$ and $R^4$, independently of one another, are an aliphatic saturated or unsaturated hydrocarbon radical having 1 up to 30 carbon atoms, more preferably having 2 to 8 carbon atoms, particularly preferably the radicals $R^1$, $R^2$, $R^3$ and $R^4$, independently of one another, are methyl, ethyl, propyl, isopropyl, n-butyl, isobutyl, pentyl or hexyl.

Furthermore preferably, the radicals $R^1$, $R^2$, $R^3$ and $R^4$ are all identical and can be selected from the above preferred aliphatic saturated or unsaturated hydrocarbon radicals.

Further preferably, the radicals $R^1$, $R^2$, $R^3$ and $R^4$ are all methyl.

More preferred guanidine-group-containing polymers according to the invention satisfy the formula (I)

$$Z \!\!-\!\!(\!\!-\!\!X \!\!-\!\! M1_{m1} \!\!-\!\! M2_{m2} \!\!-\!\! M3_{m3} \!\!-\!\! M4_{m4} \!\!-\!\! M5_{m5} \!\!-\!\! M6_{m6} \!\!-\!\! J)_i \quad \text{(I)}$$

where

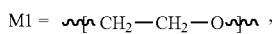

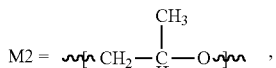

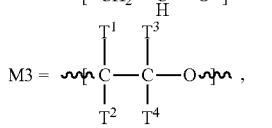

where $T^1$, $T^2$, $T^3$ and $T^4$, independently of one another, are hydrogen or linear, cyclic or branched, aliphatic or aromatic, saturated or unsaturated hydrocarbon radicals having 1 up to 12 carbon atoms, preferably 2 to 8 carbon atoms, which can optionally contain halogen atoms, with the proviso that $T^1$, $T^2$, $T^3$ and $T^4$ are not selected such that M3 is the same as M1 or M2, optionally in each case two radicals from $T^1$, $T^2$, $T^3$ and $T^4$ can also together form a three- to eight-membered ring,

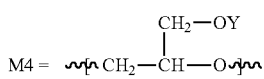

where Y, independently of the others, is a linear, cyclic or branched, aliphatic or aromatic, saturated or unsaturated hydrocarbon radical having 1 to 30 carbon atoms, preferably having 2 to 15 carbon atoms, which can also contain heteroatoms,

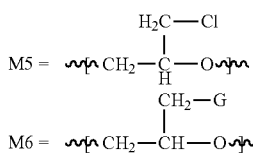

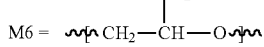

where G is a guanidine radical of the formula,

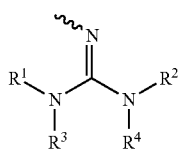

where
$R^1$, $R^2$, $R^3$ and $R^4$, independently of one another, are a linear, cyclic or branched, aliphatic saturated or unsaturated hydrocarbon radical having 1 up to 30 carbon atoms, or an aromatic hydrocarbon radical having 6 up to 30 carbon atoms, which can also contain heteroatoms, i=1 to 10, preferably 1 to 4, particularly preferably 1 to 3,
m1, m2, m3, m4 and m5=in each case independently of one another, 0 to 500,
m6 is greater than or equal to 1 to 100, preferably 1.5 to 50, more preferably 2 to 40 and particularly preferably greater than 2 to 30,
where the sum of m1 and m2 must be at least 3, preferably at least 5.
X=independently of the others O, NH, N-alkyl, N-aryl or S, preferably oxygen
Z=is independently of the others an i-functional linear, cyclic or branched, aliphatic saturated or unsaturated hydrocarbon radical having 1 up to 30 carbon atoms, preferably having 2 up to 30 carbon atoms, further preferably having 3 to 25, more preferably having more than 3 up to 20, particularly preferably having 4 to 15 carbon atoms or Z is an aromatic hydrocarbon radical having 6 up to 30 carbon atoms, preferably more than 6 up to 20, particularly preferably 8 to 12 carbon atoms,
J independently of the others is hydrogen, a linear, cyclic or branched, aliphatic or aromatic, saturated or unsaturated hydrocarbon radical having 1 up to 30 carbon atoms, a carboxylic acid radical having 1 to 30 carbon atoms or a heteroatom-substituted, functional, organic, saturated or unsaturated radical.

The index numbers reproduced here and the value ranges for the indices indicated may be understood as average values of the possible statistical distribution of the structures and/or mixtures thereof that are actually present. This also applies to structural formulae exactly reproduced per se as such, such as for example formula W.

The guanidine-group-containing polymers according to the invention comprising the structural element of the formulae (Ia) and preferably the compounds of the formula (I) preferably have no double bonds resulting from a hydrogen chloride elimination, more preferably no double bonds apart from those in the substituent Z, especially preferably no double bonds.

Preferably, m1 assumes values from 0 to 200, more preferably 1 to 50 and particularly preferably 2 to 30.

Furthermore preferably, m2 assumes values from 1 to 400, further preferably 2 to 300, more preferably 3 to 200, furthermore preferably 4 to 150 and particularly preferably 5 to 100.

Furthermore preferably, m3 assumes values from 0 to 50, more preferably greater than 0 to 30 and particularly preferably from 1 to 15.

Further preferably, m4 assumes values from 0 to 50, more preferably greater than 0 to 30 and especially preferably from 1 to 15.

Furthermore preferably, m5 assumes values from 0 to 25, more preferably 0 to 15 and particularly preferably from 0 to 6.

Preferably, the radicals $R^1$, $R^2$, $R^3$ and $R^4$, independently of one another, are linear or branched hydrocarbon having 1 to 8 carbon atoms, more preferably all identical and particularly preferably all methyl groups.

Preferably, the radicals $T^1$, $T^2$, $T^3$ and $T^4$, independently of one another, are hydrogen or linear or branched hydrocarbons having 2 to 8 carbon atoms, with the proviso that $T^1$, $T^2$, $T^3$ and $T^4$ are not selected such that M3 is the same as M1 or M2.

The guanidine-group-containing polymers according to the invention comprising the structural element of the formula (Ia) and preferably the compounds of the formula (I) have a weight-average molar mass from 200 to 50 000 g/mol, preferably from 400 to 35 000 g/mol and particularly preferably from 700 to 25 000 g/mol.

The guanidine-group-containing polymers according to the invention comprising the structural element of the formulae (Ia) and preferably the compounds of the formula (I) can be chloromethyl- and guanidine-group-functionalized to a varying extent. The molar fraction of the units with the index m5 and m6 is preferably from 1 to 30%, preferably from 2 to 25% and particularly preferably 3 to 20%, based on the sum of the units with the indices m1, m2, m3, m4, m5 and m6, which gives 100%.

The preferably present organic radical Z is preferably a radical of the compound of the formula (II)

$$Z\text{—}(OH)_i \qquad (II)$$

without OH groups.

Preferred compounds of the formula (II) are compounds of the group of alcohols, polyetherols or phenols, preferably allyl alcohol, butanol, octanol, dodecanol, stearyl alcohol, 2-ethylhexanol, cyclohexanol, benzyl alcohol, ethylene glycol, 1,3-propylene glycol, 1,2-propylene glycol, 1,4-butanediol, 1,6-hexanediol, trimethylolpropane, glycerol, pentaerythritol, sorbitol, xylitol or mannitol.

The radicals Z preferably have a molar mass of 15 to 4983 g/mol, in particular 41 to 3000 g/mol.

Preferably, the index i is 1. Preferred monoalcohols are n-alkanols, preferably allyl alcohol, butanol, octanol, dodecanol, stearyl alcohol or branched monoalkanols, preferably 2-ethylhexanol.

The guanidine-group-containing polymers according to the invention or produced according to the invention comprising the structural element of the formula (Ia) and preferably the compounds of the formula (I) are preferably colourless to yellow-brown products which can be clear or opaque.

Preferred guanidine-group-containing compounds according to the invention of the formula (I) are those in which the indices and radicals are
i=1 to 2,
m1=0 to 30,
m2=3 to 500,
m3=0 to 20,
m4=0 to 20,
m5=0 to 10,
m6=1 to 30, and
J=hydrogen,
X=oxygen,
Y=an allyl radical,
$R^1$, $R^2$, $R^3$ and $R^4$, independently of one another, are linear or branched hydrocarbons having 1 to 8 carbon atoms,
$T^1$, $T^2$, $T^3$ and $T^4$, independently of one another, are hydrogen or linear or branched hydrocarbons having 2 to 8 carbon atoms, with the proviso that $T^1$, $T^2$, $T^3$ and $T^4$ are not selected such that M3 is the same as M1 or M2, and
Z=independently of one another mono- or divalent linear or branched saturated or unsaturated hydrocarbon radical having 2 to 18 carbon atoms.

Particularly preferred guanidine-group-containing compounds according to the invention of the formula (I) are those where the indices and radicals are
i=1 to 2,
m1=0 to 20,
m2=5 to 200,
m3=0 to 10,
m4=0 to 10,
m5=0 to 3,
m6=1 to 20, and
J=hydrogen,
X=oxygen,
$R^1$, $R^2$, $R^3$ and $R^4$ are methyl groups, and
Z=independently of the others allyl or butyl groups.

The various fragments of the oxyalkylene radicals given in the formula (I) can be in statistical distribution. Statistical distributions can be blockwise in structure with any desired number of blocks and any desired sequence or be subject to a randomized distribution, they can also have an alternating structure or else form a gradient via the chain, in particular they can also form all mixed forms in which optionally groups of different distributions can follow one another. The statistical distributions can be subject to restrictions resulting from specific embodiments. Wherever the restriction does not apply, there is no change to the statistical distribution.

The index numbers reproduced here and the value ranges for the indices indicated may be understood as average values of the possible statistical distribution of the structures and/or mixtures thereof that are actually present. This also applies to structural formulae reproduced exactly per se as such, such as for example formulae (I), (II) and (III).

Wherever molecules or molecule fragments have one or more stereocentres or can be differentiated into isomers on account of symmetries or can be differentiated into isomers on account of other effects e.g. restricted rotation, all possible isomers are included by the present invention. Isomers are known to the skilled person; the reader is referred particularly to the definitions given by Professor Kazmaier of the Saarland University, e.g. http://www.uni-saarland.de/fak8/kazmaier/PDF_files/vorlesungen/Stereochemie%20Strassb%20Vorlage.pdf.

The guanidine-group-containing polymers according to the invention comprising the structural element of the formula (Ia) and preferably the compounds of the formula (I) are obtained with the process according to the invention described below.

In the preferred process according to the invention for preparing guanidine-group-containing polymers comprising the structural element

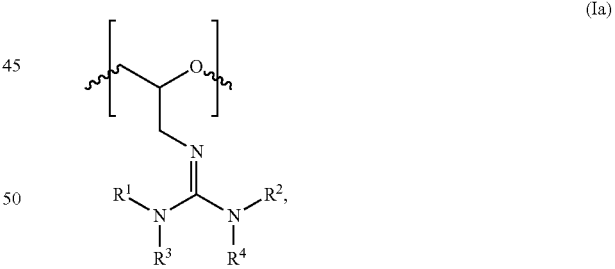

in a first step (a) a compound of the formula (II)

$$Z\text{—}(OH)i \qquad (II)$$

where
Z=is independently of the others an i-functional linear, cyclic or branched, aliphatic saturated or unsaturated hydrocarbon radical having 1 up to 30 carbon atoms, preferably having 2 up to 30 carbon atoms, further preferably having 3 to 25, more preferably having more than 3 up to 20, particularly preferably having 4 to 15 carbon atoms or Z is an aromatic hydrocarbon radical having 6 up to 30 carbon atoms, preferably more than 6 up to 20, particularly preferably 8 to 12 carbon atoms, i=1 to 10, preferably 1 to 4, particularly preferably 1 to 3, is reacted, using a double metal cyanide catalyst, preferably zinc hexacyanocobaltate, with epichlorohydrin and further alkylene oxides, and subsequently in a second step (b) is reacted with a guanidine compound of the formula (III)

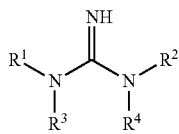
(III)

where

R$^1$, R$^2$, R$^3$ and R$^4$, independently of one another, are a linear, cyclic or branched, aliphatic saturated or unsaturated hydrocarbon radical having 1 up to 30 carbon atoms, or an aromatic hydrocarbon radical having 6 up to 30 carbon atoms, which can also contain heteroatoms.

Preferably, the second process step (b) proceeds without elimination to unsaturated compounds.

Alkoxylation reactions are typically obtained by reacting a hydroxy-functional starter in the presence of a suitable catalyst with alkylene oxides in an alkoxylation reaction.

A process for producing such alkoxylation products uses basic catalysts such as e.g. the alkali metal hydroxides or the alkali metal methylates. It is not always possible to use alkaline catalysis, as e.g. in the presence of base-labile functional groups in the starting materials. Thus, e.g. the alkoxylation of epihalohydrins using alkali metal hydroxides or alkali metal methylates is not practicable since the halogen atoms are in this case subject to uncontrollable secondary reactions.

Processes for acidic catalysis with HBF$_4$ and/or Lewis acids such as e.g. BF$_3$, AlCl$_3$ and SnCl$_4$ in the alkoxylation have been developed (DE 10 2004 007561). A disadvantage of the acid-catalyzed polyether synthesis is the defective regioselectivity during the ring opening of asymmetrical oxiranes such as epichlorohydrin. This leads, in a manner that cannot be controlled, to polyoxyalkylene chains with partly secondary and partly primary OH termini. The molar masses of the polyethers that can be achieved, moreover, are relatively small as a consequence of chain breaks and secondary reactions compared to other catalysts. Furthermore, these products have a high polydispersity.

Double metal cyanide (DMC) catalysts are known as catalysts for producing polyethers. The DMC-catalysed alkoxylation proceeds very selectively and rapidly and permits the preparation of polyethers with high molar masses for comparatively low polydispersity. The preparation and use of double metal cyanide complexes as alkoxylation catalysts is known and is disclosed for example in U.S. Pat. No. 3,427,256, U.S. Pat. No. 3,427,334, U.S. Pat. No. 3,427,335, U.S. Pat. No. 3,278,457, U.S. Pat. No. 3,278,458 and U.S. Pat. No. 3,278,459. Specific DMC catalysts such as zinc-cobalt hexacyano complexes are described in U.S. Pat. No. 5,470,813 and U.S. Pat. No. 5,482,908. One advantage of these catalysts is their low application amount.

In the first process step (a) of the process according to the invention, besides epichlorohydrin, preference is given to using ethylene oxide, propylene oxide and alkylene oxides

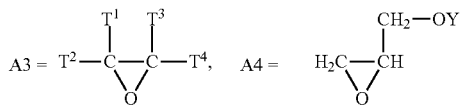

where T$^1$, T$^2$, T$^3$ and T$^4$, independently of one another, are hydrogen or linear, cyclic or branched, aliphatic or aromatic, saturated or unsaturated hydrocarbon radicals having 1 up to 12 carbon atoms, preferably 2 to 8 carbon atoms, which can optionally contain halogen atoms, with the proviso that T$^1$, T$^2$, T$^3$ and T$^4$ are not selected such that A3 is ethylene oxide or propylene oxide, optionally in each case two radicals from T$^1$, T$^2$, T$^3$ and T$^4$ can also together form a three- to eight-membered ring, where Y, independently of the others, is a linear, cyclic or branched, aliphatic or aromatic, saturated or unsaturated hydrocarbon radical having 1 to 30 carbon atoms, preferably having 2 to 15 carbon atoms, which can also contain heteroatoms.

The alkylene oxides can be used as any desired mixtures and/or also individually and/or alternately.

Preferably, in the first process step (a), the epichlorohydrin is used in a mixture with one or more further alkylene oxides having 2 to 18 carbon atoms, preferably selected from the group comprising, for example, ethylene oxide, propylene oxide, 1,2-butylene oxide and/or styrene oxide and particularly preferably in a mixture with propylene oxide. Furthermore preferably, process step (a) is carried out at a temperature of from 60 to 250° C., preferably from 90 to 160° C. and particularly preferably about 100 to 130° C.

Furthermore preferably, process step (a) is carried out at a pressure of from 0.02 bar to 100 bar, preferably 0.05 to 20 bar.

Particularly preferably, process step (a) is carried out at a temperature of 90 to 130° C. and at a pressure of from 0.01 to 5 bar.

The reaction products of the process according to the invention after the first process step (a) have one or more chemically bonded chlorine atoms, preferably from 2 to 50, particularly preferably from 2 to 40, very particularly preferably from 3 to 25 chlorine atoms.

Furthermore, the reaction products preferably have a weight-average molar mass of from 200 to 50 000 g/mol, preferably 400 to 35 000 g/mol, particularly preferably 700 to 25 000 g/mol.

Furthermore, the reaction products preferably have a polydispersity of Mw/Mn of 1.0 to 2, more preferably of 1.08 to 1.8, particularly preferably from 1.1 to 1.6.

Particularly preferred reaction products have 1 to 20 chlorine atoms and a weight-average molar mass of 800 to 7000 g/mol.

Further particularly preferred reaction products have 1 to 20 chlorine atoms and a weight-average molar mass of 800 to 7000 g/mol and a polydispersity of 1.05 to 1.6.

Preferably, in the second step (b) of the process according to the invention, the products of the first step (a) are reacted with guanidines, where the radicals R$^1$, R$^2$, R$^3$ and R$^4$, independently of one another, are an aliphatic saturated or unsaturated hydrocarbon radical having 1 up to 30 carbon atoms, more preferably having 2 to 8 carbon atoms, particularly preferably the radicals R$^1$, R$^2$, R$^3$ and R$^4$, independently of one another, are methyl, ethyl, propyl, isopropyl, n-butyl, isobutyl, pentyl or hexyl. Furthermore preferably, the radicals R$^1$, R$^2$, R$^3$ and R$^4$ are all identical and can be selected from the above preferred aliphatic saturated or unsaturated hydrocarbon radicals.

Furthermore preferably, the radicals $R^1$, $R^2$, $R^3$ and $R^4$ are all methyl.

The substitution can take place either partially or completely. Detection of complete conversion preferably takes place by means of 13C-NMR spectroscopy.

One advantage of the process according to the invention is that the substitution in the second step (b) proceeds without elimination to unsaturated compounds. On account of the strong basicity, it would have been expected that, with the cleaving off of hydrogen chloride, unsaturated compounds would be formed, as are known from EP2676986 (US 2013/0345318).

Furthermore preferably, process step (b) is carried out at a temperature of 40 to 200° C., and particularly preferably about 70 to 160° C.

Furthermore preferably, process step (b) is carried out over the course of 1 hour ranging to 50 hours and particularly preferably over the course of 2 to 30 hours.

Furthermore preferably, in process step (b) the amount of the guanidine groups in the reaction mixture, based on the chlorine content in the copolymer, is from 0.5 to 5 equivalents, particularly preferably 1.0 to 4 equivalents and particularly preferably 1.5 to 3 equivalents.

Furthermore preferably, in process step (b), the salts formed in the course of the reaction are removed from the product by means of filtration or by means of extraction. Preferred extractants are water or aqueous solutions of acids or bases.

Furthermore preferably, at the end of process step (b), the excess guanidine compound is distilled off, optionally with the application of subatmospheric pressure. Furthermore particularly preferably, the process step (b) of the process according to the invention is carried out using from 1 to 3 equivalents of tetramethylguanidine at a temperature of 90° C. to 160° C. over the course of 8 to 30 hours, where the guanidinium chloride is filtered off and the excess tetramethylguanidine is distilled off at a temperature of 100° C. and a pressure of 1.5 mbar.

Guanidine-functionalized polyethers produced by said process contain at least one guanidine group. They have a weight-average molecular weight in the range from at least 200 g/mol to 50 000 g/mol, preferably from 400 to 35 000 g/mol and particularly preferably from 700 to 25 000 g/mol.

The inventive process optionally has a third step (c) in which the product of the second step (b) is further reacted, with the formation of at least one guanidinium group, the reaction leading to the formation of quaternary compounds.

In the context of the present invention, quaternization is to be understood as meaning not only the reaction of guanidine-group-containing polyethers of the formula (I) with alkylating agents, but also the reaction with acids.

It is known to the person skilled in the art that the protonation of guanidine compounds such as those of formula (I) is dependent on the pKa value and any solvents present, in principle Bronsted acids are suitable for the protonation.

Preferred acids can be mineral acids such as e.g.: hydrofluoric acid, hydrochloric acid, hydrobromic acid, nitric acid, sulphuric acid, phosphoric acid or amidosulphonic acid and organic acids such as e.g. trifluoroacetic acid, lactic acid, acetic acid and p-toluenesulphonic acid, more preferably organic acids, in particular acetic acid. Particularly preferred acids are halogen-free.

Alkylating agents that can be used are alkyl, aryl or aralkyl halides such as e.g. methyl chloride, methyl bromide, methyl iodide, ethyl bromide or ethyl iodide, benzyl halides, such as benzyl chloride or benzyl bromide; di-alkyl, aryl or aralkyl sulphates such as e.g. dimethyl sulphate or diethyl sulphate; or oxonium salts such as e.g. trimethyloxonium chloride, trimethyloxonium bromide, trimethyloxonium tetrafluoroborate, triethyloxonium chloride; triethyloxonium bromide and triethyloxonium tetrafluoroborate, preferably dialkyl sulphates, particularly preferably dimethyl sulphate. Particularly preferred alkylating agents are halogen-free.

It is known to the person skilled in the art that the quaternized polyethers in stoichiometric ratios comprise the corresponding anions of the alkylating agents used or of the acids used.

It can be advantageous if the anions are at least partially replaced with the help of an ion exchanger. The exchanged anions arise from the prior loading of the ion exchangers in a manner known to the person skilled in the art. The exchange of halogen-containing anions or halides for anions which contain no halogen atoms is particularly advantageous.

Associated with the quaternization, the polymer gains in substantivity on textile or fibrous substrates compared to the unmodified guanidine-group-containing compounds; and also in influence on their tendency towards electrostatic charging.

A further subject matter of the invention is guanidine-group-containing alkoxylation products, preferably compounds of the formula (I) produced by the process according to the invention.

A further subject matter of the invention is compositions comprising the guanidine-group-containing polymers according to the invention comprising the structural element of the formula (Ia) and preferably the compounds of the formula (I) or the products of the process according to the invention.

Preferably, the compositions according to the invention further comprise additives and auxiliaries, which can be selected from the list comprising siccatives, flow agents, colours and/or coloured pigments, wetting agents, binders, reactive thinners, surfactants, thermally activatable initiators, photoinitiators, catalysts, emollients, emulsifiers, antioxidants, hydrotropes (or polyols), solids and fillers, pearlescent additives, insect repellants, antifouling agents, nucleating agents, preservatives, optical brighteners, fire retardants, antistatics, blowing agents, plasticizers, perfumes, active ingredients, care additives, superfatting agents, solvents and/or viscosity modulators. Preferred additives are colours and/or coloured pigments.

A further subject matter of the invention is the use of the guanidine-group-containing polymers according to the invention comprising the structural element of the formula (Ia) and preferably the compounds of the formula (I), and also their compositions as catalysts in the production of polyurethanes, as curing agents for epoxide resins, alkoxysilyl-group-carrying systems and further basically catalyzable formulations.

A further subject matter of the invention is the use of the guanidine-group-containing polymers according to the invention comprising the structural element of the formula (Ia) and preferably the compounds of the formula (I), and also their compositions as dispersion additive in coatings, paints, coating compositions and pigment pastes.

EXAMPLES

Chemicals used: N,N,N',N'-tetramethylguanidine (99%) was acquired from Sigma-Aldrich. Epichlorohydrin 99%)

was acquired from Fluka. Pluriol A 350 E was acquired from BASF SE. Double metal cyanide catalyst was acquired from Bayer AG and propylene oxide and ethylene oxide were acquired from GHC Gerling, Holz & CO Handels GmbH. Allyl glycidyl ether was acquired from Acros Organics and butylene oxide was acquired from Merck KGaA.

GPC Measurements:

GPC measurements for determining the polydispersity and weight-average molar masses Mw were carried out under the following measurement conditions: column combination SDV 1000/10 000 Å (length 65 cm), temperature 30° C., THF as mobile phase, flow rate 1 ml/min, sample concentration 10 g/l, RI detector, evaluation of the chlorine-containing polyethers was carried out against polypropylene glycol standard (76-6000 g/mol).

Determination of the Content of Chlorine:

The determination of the content of chlorine was carried out with the help of $^{13}$C-NMR spectroscopy. An NMR spectrometer of the Bruker Avance 400 type was used, the samples were dissolved for this in $CDCl_3$.

Determination of the Iodine Number (IN):

Iodine numbers were determined according to the method DGF C-V 11 a (53) of the Deutsche Gesellschaft für Fettwissenschaft [German Society for Fat Science]. Here, the samples were reacted with iodine monobromide, with the excess being converted to iodine by adding potassium iodide and this was back-titrated.

Example A: Preparation of Chlorine-Containing Polyethers

Example A1: Preproduct PE 1

In a 5 liter autoclave, a starter of 685.6 g of poly(oxyethylene) monoallyl ether (mass-average molar mass Mw=380 g/mol) and 1.5 g of zinc hexacyanocobaltate DMC catalyst was introduced and heated to 130° C. with stirring. The reactor was evacuated to an internal pressure of 30 mbar in order to distillatively remove any volatile ingredients present. To activate the DMC catalyst, a portion of 60 g of propylene oxide was introduced. After the reaction had started and the internal pressure had dropped, firstly a further 454 g of propylene oxide are metered in with cooling. Then, under identical conditions, 1029 g of propylene oxide and 327 g of epichlorohydrin in a mixture were metered in over the course of 2.5 hours at 130° C. and a maximum reactor internal pressure of 2.9 bar. A 45-minute post-reaction at 130° C. followed. Finally, as end block a further 514 g of propylene oxide were added at 130° C. After another post-reaction, a degasification stage was carried out in vacuo at 130° C. The virtually colourless low-viscosity chlorine-containing alkoxylation product was cooled to below 90° C. and discharged from the reactor. According to GPC, the product had a weight-average molar mass of 1556 g/mol, a polydispersity Mw/Mn of 1.18 and, according to 13C-NMR analysis, contained 2 mol of Cl per molecule, IN=15.

Example A2: Preproduct PE 2

In a 5 liter autoclave, a starter of 615.6 g of poly(oxypropylene)-co-poly(oxyethylene) monoallyl ether (comprises 80% by weight PO and 20% by weight EO) with the mass-average molar mass Mw=780 g/mol and 2.25 g of zinc hexacyanocobaltate DMC catalyst was initially introduced and heated to 130° C. with stirring. The reactor was evacuated to an internal pressure of 30 mbar in order to distillatively remove any volatile ingredients present. To activate the DMC catalyst, a portion of 75 g of propylene oxide was introduced. After the reaction had started and the internal pressure had dropped, firstly a further 155 g of propylene oxide were metered in with cooling. Then, under the same conditions, 1469 g of propylene oxide and 439 g of epichlorohydrin in a mixture were metered in over the course of 60 min at 130° C. and a maximum reactor internal pressure of 2.7 bar. A 30-minute post-reaction at 130° C. followed, in the course of which the internal pressure in the reactor dropped to 0.5 bar. Finally, as end block, a further 230 g of propylene oxide were added at 130° C. After another post-reaction under the same conditions, a degasification stage followed. Here, volatile fractions such as residual propylene oxide and epichlorohydrin were distilled off in vacuo at 130° C. The virtually colourless, low-viscosity chlorine-containing alkoxylation product was cooled to below 90° C. and discharged from the reactor. According to GPC, the product had a weight-average molar mass of 2754 g/mol, a polydispersity Mw/Mn of 1.28 and, according to 13C-NMR analysis, contained 6 mol of Cl per molecule, IN=6.9 g iodine/100 g.

Example A3: Preproduct PE 3

In a 5 liter autoclave, a starter of 500 g of poly(oxypropylene)diol with the molar mass Mw=767 g/mol (calculated from the OH number) and 1.3 g of zinc hexacyanocobaltate DMC catalyst was introduced and heated to 130° C. with stirring. The reactor was evacuated to an internal pressure of 30 mbar in order to distillatively remove any volatile ingredients present. To activate the DMC catalyst, a portion of 75 g of propylene oxide was introduced. After the reaction had started and the internal pressure had dropped, firstly a further 227 g of propylene oxide were metered in with cooling. Then, under the same conditions, 1132 g of propylene oxide and 360 g of epichlorohydrin in a mixture were metered in over the course of 60 min at 130° C. and a maximum reactor internal pressure of 2.7 bar. A 30-minute post-reaction at 130° C. followed, in the course of which the internal pressure of the reactor dropped to 0.5 bar. Finally, as end block, a further 377 g of propylene oxide were added at 130° C. After another post-reaction under the same conditions, a degasification stage followed. Here, volatile fractions such as residual propylene oxide and epichlorohydrin were distilled off in vacuo at 130° C. The virtually colourless chlorine-containing alkoxylation product was cooled to below 90° C. and discharged from the reactor. According to GPC, the product had a weight-average molar mass of 3430 g/mol, a polydispersity Mw/Mn of 1.3 and, according to 13C-NMR analysis, comprised 6 mol of Cl per molecule.

Example A4: Preproduct PE 4

In a 5 liter autoclave, a starter of 39 g of octanol and 1.5 g of zinc hexacyanocobaltate DMC catalyst was introduced and heated to 130° C. with stirring. The reactor was evacuated to an internal pressure of 30 mbar in order to distillatively remove any volatile ingredients present. To activate the DMC catalyst, a portion of 80 g of propylene oxide was introduced. After the reaction had started and the internal pressure had dropped, firstly 171 g of allyl glycidyl ether and 174 g of propylene oxide in a mixture were metered in with cooling. Then, under the same conditions, 1218 g of propylene oxide and 276 g of epichlorohydrin in a mixture were metered in over the course of 60 min at 130° C. and a maximum reactor internal pressure of 2.7 bar. Furthermore, 174 g of PO in a mixture with 108 g of BO were metered in.

A 40-minute post-reaction at 130° C. followed, in the course of which the internal pressure in the reactor dropped to 0.5 bar. Finally, as end block, a further 760 g of propylene oxide were added at 130° C. After another post-reaction under the same conditions, a degasification stage followed. Here, volatile fractions such as residual epoxides were distilled off in vacuo at 130° C. The virtually colourless, high-viscosity chlorine-containing alkoxylation product was cooled to below 90° C. and discharged from the reactor. According to GPC, the product had a weight-average molar mass of 8764 g/mol, a polydispersity Mw/Mn of 1.5 and, according to 13C-NMR analysis, comprised 9.6 mol of CI per molecule.

Example A5: Preproduct PE 5

In a 5 liter autoclave, a starter of 396 g of Pluriol A 350 E (poly(oxyethylene) monomethyl ether with the mass-average molar mass Mw=350 g/mol) and 1.5 g of zinc hexacyanocobaltate DMC catalyst was introduced and heated to 130° C. with stirring. The reactor was evacuated to an internal pressure of 30 mbar in order to distillatively remove any volatile ingredients present. To activate the DMC catalyst, a portion of 40 g of ethylene oxide was introduced. After the reaction had started and the internal pressure had dropped, firstly a further 209 g of EO followed by 657 g of propylene oxide were metered in with cooling. Then, under the same conditions, 985 g of propylene oxide and 312 g of epichlorohydrin in a mixture were metered in over the course of 60 min at 130° C. and a maximum reactor internal pressure of 2.7 bar. A 40-minute post-reaction at 130° C. followed, in the course of which the internal pressure of the reactor dropped to 0.5 bar. Finally, as end block, a further 398 g of ethylene oxide were added at 130° C. After another post-reaction under the same conditions, a degasification stage followed. Here, volatile fractions such as residual epoxides were distilled off in vacuo at 130° C. The virtually colourless, viscous chlorine-containing alkoxylation product was cooled to below 90° C. and discharged from the reactor. According to GPC, the product had a weight-average molar mass of 2126 g/mol, a polydispersity Mw/Mn of 1.1 and, according to 13C-NMR analysis, contained 3 mol of CI per molecule.

Example B: Reaction of Chlorine-Containing Polyethers with N,N,N',N'-Tetramethylguanidine Example B1

In a multineck flask with CPG paddle stirrer, reflux condenser, inert gas feed line and temperature sensor, 100 g of the chlorine-containing polyether PE1 and 63 g of N,N,N',N'-tetramethylguanidine (TMG) were introduced and heated to 150° C. with stirring. After a reaction time of 13 hours, the crude product was freed from precipitated tetramethylguanidinium hydrochloride by means of filtration, and the excess TMG was removed on a rotary evaporator (T=110° C., p<1 mbar). This gave a clear yellow-brown liquid product. The complete substitution of the chlorine, and also the absence of double bonds from eliminations were demonstrated by means of $^{13}$C-NMR.

Example B2

In a multineck flask with CPG paddle stirrer, reflux condenser, inert gas feed line and temperature sensor, 230.9 g of the chlorine-containing polyether PE2 and 169.1 g of N,N,N',N'-tetramethylguanidine (TMG) were introduced and heated to 150° C. with stirring. After a reaction time of 26 hours, the crude product was freed from precipitated tetramethylguanidinium hydrochloride by means of filtration, and the excess TMG was removed on a rotary evaporator (T=110° C., p<1 mbar). This gave a clear brown liquid product. The complete substitution of the chlorine, and also the absence of double bonds from eliminations were demonstrated by means of $^{13}$C-NMR.

Example B3

In a multineck flask with CPG paddle stirrer, reflux condenser, inert gas feed line and temperature sensor, 80 g of the chlorine-containing polyether PE3 and 60.3 g of N,N,N',N'-tetramethylguanidine (TMG) were introduced and heated to 150° C. with stirring. After a reaction time of 28 hours, the crude product was freed from precipitated tetramethylguanidinium hydrochloride by means of filtration, and the excess TMG was removed on a rotary evaporator (T=110° C., p<1 mbar). This gave a clear brown liquid product. The complete substitution of the chlorine, and also the absence of double bonds were demonstrated by means of $^{13}$C-NMR.

Example B4

In a multineck flask with CPG paddle stirrer, reflux condenser, inert gas feed line and temperature sensor, 100 g of the chlorine-containing polyether PE4 and 44 g of N,N,N',N'-tetramethylguanidine (TMG) were introduced and heated to 150° C. with stirring. After a reaction time of 30 hours, the crude product was freed from precipitated tetramethylguanidinium hydrochloride by means of filtration, and the excess TMG was removed on a rotary evaporator (T=110° C., p<1 mbar). This gave a clear brown liquid product. According to $^{13}$C-NMR analysis, the product comprised 1.8 mol of chlorine, 7.8 mol of guanidine units per molecule and no double bonds.

Example B5

In a multineck flask with CPG paddle stirrer, reflux condenser, inert gas feed line and temperature sensor, 100 g of the chlorine-containing polyether PE5 and 39 g of N,N,N',N'-tetramethylguanidine (TMG) were introduced and heated to 150° C. with stirring. After a reaction time of 21 hours, the crude product was freed from precipitated tetramethylguanidinium hydrochloride by means of filtration, and the excess TMG was removed on a rotary evaporator (T=110° C., p<1 mbar). This gave a clear yellow-brown liquid product. The complete substitution of the chlorine and the absence of double bonds were demonstrated by means of $^{13}$C-NMR.

Examination of Dispersion Properties

The compounds of Examples B1 and B2 were examined for their ability to act as a dispersing additive.

To assess pigment concentrations, it is customary to produce a white tint and to conduct a rub-out test. The white coating material for this test was produced according to the following formulation:

| Production of the white paste: | |
| --- | --- |
| Raw materials | Amount |
| TD755W | 8.7 |
| Demineralized water | 19.9 |

-continued

Production of the white paste:

| Raw materials | Amount |
|---|---|
| Foamex 830 | 1.0 |
| Parmetol K 40 | 0.1 |
| Aerosil 200 | 0.3 |
| Kronos 2310 | 70.0 |
| Total | 100.0 |

The grinding was effected in a Lau Disperser for 1 h. Glass beads were added to the mixture in a weight ratio of 1:1.

Letdown:

| Raw materials | Amount |
|---|---|
| White paste | 45.0 |
| Neocryl XK 90 | 51.9 |
| Texanol | 1.6 |
| Tego Wet KL 245 | 0.5 |
| Visko Plus 3000 | 1.0 |
| Total | 100.0 |

For the letdown, the mixture was stirred with the dissolver at moderate shear rate for 15 min. The glass beads were sieved off by means of a water-resistant paper sieve.

Production of the White Tints

The white tints comprising the respective colour pastes were made up according to the following formulations:

| | Blue:white 1:25 | | Black:white 1:25 | | Red:white 1:10 |
|---|---|---|---|---|---|
| | 30% pigment | 40% pigment | 30% pigment | 33% pigment | 60% pigment |
| White coating material | 20.0 | 20.0 | 20.0 | 20.0 | 20.0 |
| Blue paste 30% | 0.84 | | | | |
| Blue paste 40% | | 0.63 | | | |
| Black paste 30% | | | 0.84 | | |
| Black paste 33% | | | | 0.76 | |
| Red paste 60% | | | | | 1.1 |

White paste and colour paste were mixed in a Speedmixer at 3000 rpm for 1 min. Thereafter, the tint was applied to a contrast card with a 100 μm coating bar and, after a ventilation time of 8 min, a rub-out was conducted using the index finger at the lower end of the card. The colour difference (ΔE*) between the rubbed and non-rubbed area, after drying (about 2-3 h), was measured with an X-Rite SP62.

Colorimetric Assessment and Calculation of Colour Intensity:

The colorimetric values of the cards produced were determined by means of a spectrophotometer (SP 68, X-Rite). The results are given in Table #20 as L-a-b values 10. Also calculated is the colour intensity compared to a reference sample. The better the dispersion of the pigment in the phase, the higher the colour intensity compared to the reference sample. The reference sample is fixed at 100% by definition.

The examination shows the advantages of the substances according to the invention in relation to colour depth compared to the prior art.

The invention claimed is:

1. A polymeric guanidine-group compound, comprising a structural element of general formula (Ia)

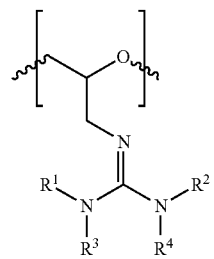

(Ia)

in at least one side-chain position,
wherein $R^1$, $R^2$, $R^3$ and $R^4$ are each independently a linear, cyclic or branched, aliphatic saturated or unsaturated hydrocarbon radical having 1 to 30 carbon atoms, or an aromatic hydrocarbon radical having 6 to 30 carbon atoms, which optionally comprise heteroatoms.

2. The compound according to claim 1 which has a structure of general formula (I)

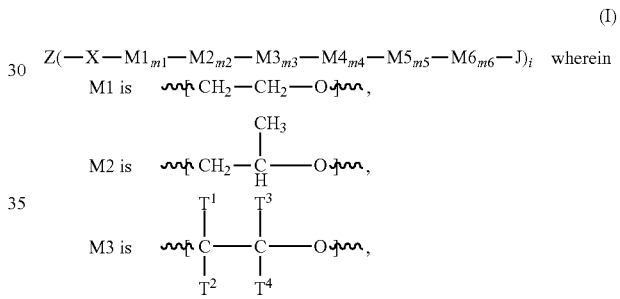

(I)

wherein $T^1$, $T^2$, $T^3$ and $T^4$ are each independently hydrogen or linear, cyclic or branched, aliphatic or aromatic, saturated or unsaturated hydrocarbon radicals having 1 to 12 carbon atoms which optionally comprise halogen atoms, with the proviso that M3 is not the same as M1 or M2, and wherein two radicals selected from $T^1$, $T^2$, $T^3$ and $T^4$ together may form a three- to eight-membered ring,

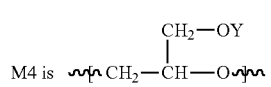

wherein Y is independently a linear, cyclic or branched, aliphatic or aromatic, saturated or unsaturated hydrocarbon radical having 1 to 30 carbon atoms, which optionally comprise heteroatoms

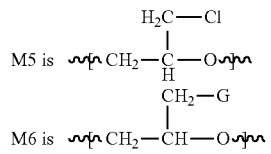

wherein G is a guanidine radical of the formula,

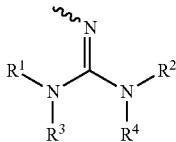

wherein
R¹, R², R³ and R⁴ are each independently a linear, cyclic or branched, aliphatic saturated or unsaturated hydrocarbon radical having 1 to 30 carbon atoms, or an aromatic hydrocarbon radical having 6 to 30 carbon atoms, which optionally comprise heteroatoms,
i is 1 to 10,
m1, m2, m3, m4 and m5 are each independently 0 to 500,
m6 is 1 to 100,
wherein the sum of m1 and m2 is at least 3,
X is independently O, NH, N-alkyl, N-aryl or S,
Z is independently an i-functional linear, cyclic or branched, aliphatic saturated or unsaturated hydrocarbon radical having 1 to 30 carbon atoms, an aromatic hydrocarbon radical having 6 to 30 carbon atoms, and
J is independently is hydrogen, a linear, cyclic or branched, aliphatic or aromatic, saturated or unsaturated hydrocarbon radical having 1 to 30 carbon atoms, a carboxylic acid radical having 1 to 30 carbon atoms or a heteroatom-substituted, functional, organic, saturated or unsaturated radical.

3. The compound according to claim 2, wherein
i is 1 to 2,
m1 is 0 to 30,
m2 is 3 to 500,
m3 is 0 to 20,
m4 is 0 to 20,
m5 is 0 to 10,
m6 is 1 to 30, and
J is hydrogen,
X is oxygen,
Y is an allyl radical,
R¹, R², R³ and R⁴ are each independently a linear or branched hydrocarbon having 1 to 8 carbon atoms,
T¹, T², T³ and T⁴ are each independently hydrogen or linear or branched hydrocarbons having 2 to 8 carbon atoms, with the proviso that M3 is not the same as M1 or M2, and
Z is independently a mono- or divalent linear or branched saturated or unsaturated hydrocarbon radical having 2 to 18 carbon atoms.

4. The compound according to claim 2, wherein
i is 1 to 2,
m1 is 0 to 30,
m2 is 5 to 200,
m3 is 0 to 10,
m4 is 0 to 10,
m5 is 0 to 3,
m6 is 1 to 20, and
J is hydrogen,
X is oxygen,
R¹, R², R³ and R⁴ are methyl groups, and
Z is independently an allyl or butyl group.

5. A process for the preparation of the polymeric guanidine-group compound according to claim 1, the method comprising:

reacting a compound of the general formula (II)

$$Z—(OH)_i \quad (II)$$

wherein
Z is independently an i-functional linear, cyclic or branched, aliphatic saturated or unsaturated hydrocarbon radical having 1 to 30 carbon atoms, or an aromatic hydrocarbon radical having 6 to 30 carbon atoms, and
i is 1 to 10,
in the presence of a double metal cyanide catalyst with epichlorohydrin and one or more alkylene oxides thereby forming a chlorine-containing polyether, and
reacting the chlorine-containing polyether with a guanidine compound of the general formula (III)

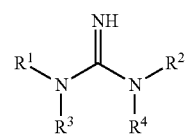

wherein
R¹, R², R³ and R⁴ are each independently a linear, cyclic or branched, aliphatic saturated or unsaturated hydrocarbon radical having 1 to 30 carbon atoms, or an aromatic hydrocarbon radical having 6 to 30 carbon atoms, which optionally comprise heteroatoms,
thereby forming the polymeric guanidine-group compound.

6. The process according to claim 5, wherein the guanidine compound of the general formula (III) is tetramethylguanidine,
wherein the molar ratio of tetramethylguanidine to the chlorine-containing polyether is 1:1 to 3:1,
wherein the reacting of the chlorine-containing polyether with the guanidine compound of the general formula (III) is performed at a temperature of 90° C. to 160° C. over a time period of 8 to 30 hours, and
wherein by-product guanidinium chloride is filtered off, and excess tetramethylguanidine is distilled off at a temperature of 100° C. and a pressure of 1.5 mbar.

7. The process according to claim 5, further comprising reacting the polymeric guanidine-group compound to obtain at least one guanidinium group, thereby forming a quaternary compound.

8. A composition comprising the polymeric guanidine-group compound according to claim 1 comprising the structural element of general formula (Ia).

9. A method, comprising:
adding the polymeric guanidine-group compound according to claim 1 comprising the structural element of general formula (Ia) to a formulation
wherein polyurethanes are obtained from the formulation and the polymer guanidine-group compound is a catalyst, or
the formulation is an epoxide resin and the polymer guanidine-group compound is a curing agent, or
the formulation is an alkoxysilyl-group-carrying system.

10. A method, comprising:
adding the polymeric guanidine-group compound according to claim 1 comprising the structural element of general formula (Ia) to a material as a dispersion additive,
wherein the material is at least one selected from the group consisting of coatings, paints, coating compositions and pigment pastes.

11. A composition comprising the polymeric guanidine-group compound according to claim 2 which has a structure of general formula (I).

12. The compound according to claim 2, wherein $T^1$, $T^2$, $T^3$ and $T^4$ are each independently hydrogen or linear, cyclic or branched, aliphatic or aromatic, saturated or unsaturated hydrocarbon radicals having 2 to 8 carbon atoms which optionally comprise halogen atoms.

13. The compound according to claim 2, wherein Y is independently a linear, cyclic or branched, aliphatic or aromatic, saturated or unsaturated hydrocarbon radical having 2 to 15 carbon atoms which optionally comprise heteroatoms.

14. The compound according to claim 2, wherein i is 1 to 3.

15. The compound according to claim 2, wherein m6 is 2 to 30.

16. The compound according to claim 2, wherein X is independently oxygen.

17. The compound according to claim 2, wherein Z is independently an i-functional linear, cyclic or branched, aliphatic saturated or unsaturated hydrocarbon radical having 4 to 15 carbon atoms or Z is an aromatic hydrocarbon radical having 8 to 12 carbon atoms.

18. The composition according to claim 8, wherein the composition is at least one selected from the group consisting of a coating, a paint, a coating composition, and a pigment paste.

19. The composition according to claim 11, wherein the composition is at least one selected from the group consisting of a coating, a paint, a coating composition, and a pigment paste.

20. A formulation comprising the polymeric guanidine-group compound according to claim 1 comprising the structural element of general formula (Ia), wherein the formulation is basically catalyzable.

* * * * *